United States Patent
Liu et al.

(10) Patent No.: US 9,598,585 B2
(45) Date of Patent: Mar. 21, 2017

(54) CONDUCTIVE COMPOSITION AND THE METHOD FOR PRODUCING THE SAME, COLOR FILTER AND THE METHOD FOR PRODUCING THE SAME

(71) Applicant: BOE Technology Group Co., Ltd., Beijing (CN)

(72) Inventors: Lu Liu, Beijing (CN); Dan Wang, Beijing (CN); Yonglian Qi, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 198 days.

(21) Appl. No.: 14/314,671

(22) Filed: Jun. 25, 2014

(65) Prior Publication Data

US 2015/0299476 A1    Oct. 22, 2015

(30) Foreign Application Priority Data

Apr. 17, 2014  (CN) .......................... 2014 1 0157490

(51) Int. Cl.
  *C09D 5/24* (2006.01)
  *H01B 1/00* (2006.01)
  (Continued)

(52) U.S. Cl.
  CPC ............... *C09D 5/24* (2013.01); *C09D 4/06* (2013.01); *C09D 163/10* (2013.01);
  (Continued)

(58) Field of Classification Search
  CPC ............ H01B 1/00; H01B 1/128; C09D 5/24
  See application file for complete search history.

(56) References Cited

U.S. PATENT DOCUMENTS

| | | | | |
|---|---|---|---|---|
| 2005/0109990 A1* | 5/2005 | Yeager | ................ | C08G 65/485 252/500 |
| 2013/0052434 A1* | 2/2013 | Asahi | .................... | G02B 1/105 428/212 |

FOREIGN PATENT DOCUMENTS

| | | |
|---|---|---|
| CN | 102627823 A | 8/2012 |
| CN | 102654675 A | 9/2012 |

(Continued)

OTHER PUBLICATIONS

English language machine translation of CN 103146291 A (pub Jun. 2013).*

(Continued)

*Primary Examiner* — Mark Kopec
(74) *Attorney, Agent, or Firm* — Westman, Champlin & Koehler, P.A.

(57) ABSTRACT

The embodiments of the invention provide a conductive composition and a method for producing the same, a color filter and a method for producing the same. The invention relates to the display technology field, and can simplify the process for producing the transparent conductive layer, and reduce the production cost; the conductive composition comprises a modified epoxy acrylic resin, a polyurethane acrylic resin, a polyaniline, a photo initiator, a fluorine-containing acrylate monomer, and optionally a filler and an auxiliary agent; wherein, in terms of weight ratio, the modified epoxy acrylic resin comprises 15-30 parts; the polyurethane acrylic resin comprises 10-20 parts; the polyaniline comprises 15-30 parts; the photo initiator comprises 2-4 parts; the fluorine-containing acrylate monomer comprises 15-35 parts; the filler comprises 0-25 parts; and the auxiliary agent comprises 0-8 parts; the conductive composition is useful for producing a display device.

6 Claims, 2 Drawing Sheets

(51) Int. Cl.
  *G02F 1/1343*  (2006.01)
  *G02B 1/16*  (2015.01)
  *H01B 1/12*  (2006.01)
  *C09D 163/10*  (2006.01)
  *C09D 175/16*  (2006.01)
  *C09D 175/14*  (2006.01)
  *C09D 4/06*  (2006.01)
  *G02F 1/1333*  (2006.01)

(52) U.S. Cl.
  CPC ......... *C09D 175/14* (2013.01); *C09D 175/16* (2013.01); *G02B 1/16* (2015.01); *G02F 1/13439* (2013.01); *H01B 1/128* (2013.01); *G02F 2001/133334* (2013.01); *G02F 2001/133337* (2013.01)

(56) References Cited

FOREIGN PATENT DOCUMENTS

| | | |
|---|---|---|
| CN | 103146291 A | 6/2013 |
| CN | 103194138 A | 7/2013 |
| WO | 2005/056686 A1 | 6/2005 |

OTHER PUBLICATIONS

English language machine translation of CN 103194138 A (pub Jul. 2013).*
First Office Action, including Search Report, for Chinese Patent Application No. 201410157490.6, dated Oct. 27, 2015, 23 pages.
Second Office Action for Chinese Patent Application No. 201410157490.6, dated Mar. 15, 2016, 12 pages.
Rejection Decision of Chinese Patent Application No. 201410157490.6, dated Aug. 2, 2016, 13 pages.

* cited by examiner

| Specific Example | 1 | 2 | 3 | 4 | 5 | 6 | 7 |
|---|---|---|---|---|---|---|---|
| Hardness (H) | 6 | 6 | 5 | 6 | 7 | 7 | 6 |

CONDUCTIVE COMPOSITION AND THE METHOD FOR PRODUCING THE SAME, COLOR FILTER AND THE METHOD FOR PRODUCING THE SAME

CROSS-REFERENCE TO RELATED APPLICATION

This Application is a non-provisional Application of Chinese Application No. CN 201410157490.6, filed Apr. 17, 2014, in Chinese, the contents of which are hereby incorporated by reference in their entirety.

FIELD OF THE INVENTION

The application relates to the display technology field, especially to a conductive composition and a method for producing the same, a color filter and a method for producing the same.

BACKGROUND OF THE INVENTION

For a display device, it is indispensable to prepare a transparent conductive layer; for instance, an antistatic layer in a Fringe-Field Switching (FFS) mode or Advanced-Super Dimensional Switching (ADS) mode liquid crystal display panel, and a common electrode in a Twisted Nematic (TN) mode liquid crystal display panel.

In the prior art, the material of the transparent conductive layer is generally a transparent metal oxide conductive material, for instance, Indium Tin Oxide (ITO), and the like. However, the deposition of the transparent metal oxide should be implemented by a sputtering device, therefore the production process is relatively complex, and the production cost is relatively high.

SUMMARY OF THE INVENTION

The embodiments of the invention provide a conductive composition and the method for producing the same, and a transparent conductive material formed by the conductive composition, a color filter and a method for producing the same, and a display device, which can simplify the production process of the transparent conductive layer, and reduce the production cost.

In order to achieve the above described object, embodiments of the invention provide the following technical solutions.

In one aspect, a conductive composition comprising a modified epoxy acrylic resin, a polyurethane acrylic resin, a polyaniline, a photo initiator, a fluorine-containing acrylate monomer, and optionally a filler and an auxiliary agent is provided, wherein, in terms of weight ratio, the modified epoxy acrylic resin comprises 15-30 parts; the polyurethane acrylic resin comprises 10-20 parts; the polyaniline comprises 15-30 parts; the photo initiator comprises 2-4 parts; the fluorine-containing acrylate monomer comprises 15-35 parts; the filler comprises 0-25 parts; and the auxiliary agent comprises 0-8 parts; wherein, the auxiliary agent comprise one or more of a leveling agent, an antifoaming agent, and a dispersant.

Alternatively, the modified epoxy acrylic resin has a functionality of from 2 to 5, and comprises one or more of a soybean oil modified epoxy acrylic resin, a modified bisphenol A epoxy acrylic resin, and an amino modified bisphenol A epoxy acrylic resin; the polyurethane acrylic resin has a functionality of from 2 to 6, and comprises an aliphatic polyurethane acrylate and/or an aromatic polyurethane acrylate; the photo initiator comprises one or more of 2,4,6-trimethylbenzoyl-diphenylphosphine oxide, ethyl 2,4,6-trimethylbenzoylphenylphosphonate, 2-hydroxyl-2-methyl-1-phenyl-1-acetone, 1-hydroxyl-cyclohexyl-phenyl-methanone, and benzoin bis-methyl ether; the fluorine-containing acrylate monomer comprises one or more of perfluoro ethyl acrylate, 1,1,2,2-tetrahydroperfluorodecyl acrylate, hexafluorobutyl acrylate, hexafluorobutyl methacrylate, 2,2,2-trifluoroethyl methacrylate, dodecafluoroheptyl methacrylate, dodecafluoroheptyl acrylate, tridecafluorooctyl methacrylate, and tridecafluorooctyl acrylate; and the filler comprises one or more of barium sulfate, talc powder, extinction powder, organic bentonite, fume silica, heavy calcium carbonate and light calcium carbonate.

An organic transparent conductive material is further provided, which is formed from the above described conductive composition by a polymerizing reaction.

A method for producing the conductive composition is further provided, which comprises: mixing and dissolving a photo initiator with a fluorine-containing acrylate monomer; adding a modified epoxy acrylic resin, a polyurethane acrylic resin and a polyaniline, and uniformly dispersing them, and optionally, at the same time of adding the modified epoxy acrylic resin, the polyurethane acrylic resin and the polyaniline, adding an auxiliary agent, wherein the auxiliary agent comprises one or more of a leveling agent, an antifoaming agent, and a dispersant; optionally adding a filler and uniformly dispersing it; grinding the uniformly mixed material, to obtain an organic transparent conductive solution; wherein, in terms of weight ratio, the modified epoxy acrylic resin comprises 15-30 parts; the polyurethane acrylic resin comprises 10-20 parts; the polyaniline comprises 15-30 parts; the photo initiator comprises 2-4 parts; the fluorine-containing acrylate monomer comprises 15-35 parts; the auxiliary agent comprises 0-8 parts; and the filler comprises 0-25 parts.

Preferably, the ground material has a fineness of less than 10 μm.

Alternatively, the modified epoxy acrylic resin has a functionality of from 2 to 5, and comprises one or more of a soybean oil modified epoxy acrylic resin, a modified bisphenol A epoxy acrylic resin, and an amino modified bisphenol A epoxy acrylic resin; the polyurethane acrylic resin has a functionality of from 2 to 6, and comprises an aliphatic polyurethane acrylate and/or an aromatic polyurethane acrylate; the photo initiator comprises one or more of 2,4,6-trimethylbenzoyl-diphenylphosphine oxide, ethyl 2,4,6-trimethylbenzoylphenylphosphonate, 2-hydroxyl-2-methyl-1-phenyl-1-acetone, 1-hydroxyl-cyclohexyl-phenyl-methanone, and benzoin bis-methyl ether; the fluorine-containing acrylate monomer comprises one or more of perfluoroethyl acrylate, 1,1,2,2-tetrahydroperfluorodecyl acrylate, hexafluorobutyl acrylate, hexafluorobutyl methacrylate, 2,2,2-trifluoroethyl methacrylate, dodecafluoroheptyl methacrylate, dodecafluoroheptyl acrylate, tridecafluorooctyl methacrylate, and tridecafluorooctyl acrylate; and the filler comprises one or more of barium sulfate, talc powder, extinction powder, organic bentonite, fume silica, heavy calcium carbonate and light calcium carbonate.

In another aspect, a color filter is provided, which comprises a black matrix, a color filter layer, a post spacer, and an organic transparent conductive layer provided on a substrate; wherein the organic transparent conductive layer is provided on the first side or the second side of the substrate; and the material of the organic transparent conductive layer is the above described transparent conductive material.

Preferably, the post spacer is provided on the first side of the substrate; the black matrix and the color filter layer are provided on the second side of the substrate, and the black matrix has openings for disposing the color filter layer.

More preferably, the organic transparent conductive layer is provided on the second side of the substrate; wherein the black matrix and the color filter layer are provided between the organic transparent conductive layer and the substrate.

A method for producing a color filter is further provided, which comprises: forming a black matrix, a color filter layer, a post spacer, and an organic transparent conductive layer on a substrate; wherein the process for forming the organic transparent conductive layer comprises: coating a transparent conductive solution on the first side or the second side of the substrate, and forming the organic transparent conductive layer by photo curing; the transparent conductive solution is prepared using the above described method.

Preferably, forming the black matrix, the color filter layer, and the post spacer on the substrate specifically comprises: forming the post spacer on the first side of the substrate; forming the black matrix and the color filter layer on the second side of the substrate; wherein the color filter layer is formed on the open area of the black matrix.

More preferably, the organic transparent conductive layer is formed on the second side of the substrate; and the process for forming the black matrix, the color filter layer, and the organic transparent conductive layer specifically comprises: forming a black matrix having plural of openings and a color filter layer on the surface at the second side of the substrate, wherein the color filter layer is formed on the open area of the black matrix, and the color filter layer comprises at least a red light resistance, a green light resistance and a blue light resistance; forming the organic transparent conductive layer on the surface of the substrate having the black matrix and the color filter layer formed thereon.

In another aspect, a display device comprising the above described color filter is provided.

The embodiments of the invention provide a conductive composition and a method for producing the same, a transparent conductive material, a color filter and a method for producing the same, and a display device, wherein the transparent conductive material is formed by the conductive composition; the conductive composition comprises a modified epoxy acrylic resin, a polyurethane acrylic resin, a polyaniline, a photo initiator, a fluorine-containing acrylate monomer, and optionally a filler and an auxiliary agent; wherein, in terms of weight ratio, the modified epoxy acrylic resin comprises 15-30 parts; the polyurethane acrylic resin comprises 10-20 parts; the polyaniline comprises 15-30 parts; the photo initiator comprises 2-4 parts; the fluorine-containing acrylate monomer comprises 15-35 parts; the filler comprises 0-25 parts; and the auxiliary agent comprises 0-8 parts.

Thus, a transparent conductive solution can be prepared from the above described conductive composition, the transparent conductive solution can be directly coated onto the substrate surface, and then an organic transparent conductive layer is formed by photo curing. Compared to the prior art using a transparent metal oxide such as ITO as the transparent conductive layer material, the invention can not only efficiently simplify the production process of the transparent conductive layer, but also avoid the use of a sputtering device, so as to reduce the production cost.

BRIEF DESCRIPTION OF THE DRAWINGS

In order to more clearly illustrate the technical solutions in the embodiments of the invention or in prior art, the figures to be used in the description of the embodiments or the prior art are briefly illustrated below. Obviously, the figures illustrated below are only several embodiments of the invention. For a person skilled in the art, other figures may also be obtained according to these figures, without inventive works.

REFERENCE NUMBERS IN FIGURES

Figure 1:
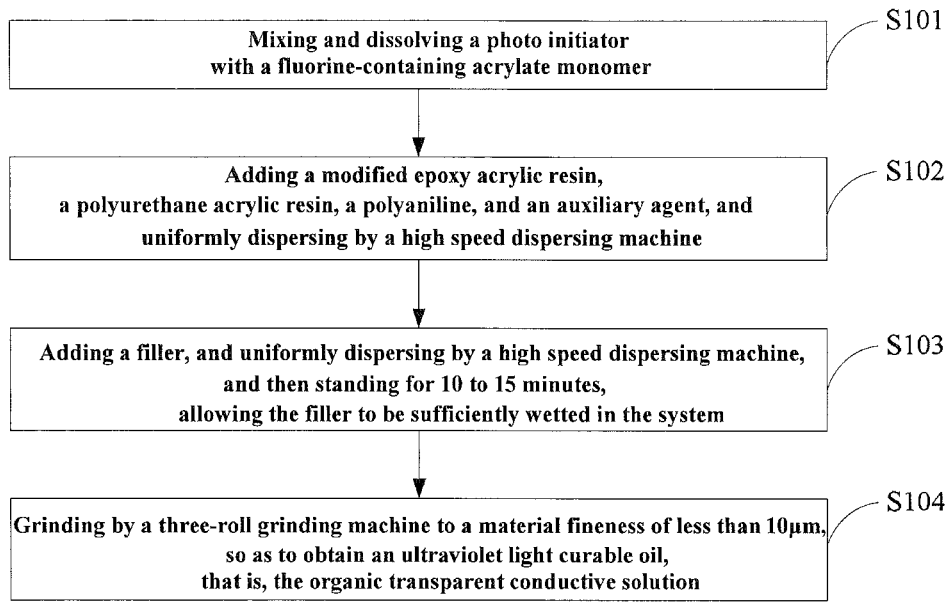
FIG. 1 is a flow scheme of the method for preparing an organic transparent conductive solution provided by one embodiment of the invention.

10—substrate;
20—black matrix;
30—color filter layer;
301—red light resistance;
302—green light resistance;
303—blue light resistance;
40—post spacer;
50—over coating (OC) layer;
60—organic transparent conductive layer.

DETAILED DESCRIPTION OF THE INVENTION

The technical solutions in embodiments of the invention will be clearly and completely described below in combination with figures in the embodiments of the invention. Obviously, the described embodiments are only a part of embodiments, not all the embodiments of the invention. On the basis of the embodiments in the invention, all of other embodiments, which may be obtained by a person skilled in the art without inventive works, fall within the scope protected by the invention.

One embodiment of the invention provides a conductive composition comprising a modified epoxy acrylic resin, a polyurethane acrylic resin, a polyaniline, a photo initiator, a fluorine-containing acrylate monomer, and optionally a filler and an auxiliary agent; wherein, in terms of weight ratio, the modified epoxy acrylic resin comprises 15-30 parts; the polyurethane acrylic resin comprises 10-20 parts; the polyaniline comprises 15-30 parts; the photo initiator comprises 2-4 parts; the fluorine-containing acrylate monomer comprises 15-35 parts; the filler comprises 0-25 parts; and the auxiliary agent comprises 0-8 parts. This conductive composition can form a transparent conductive material, which is an organic transparent conductive material, through a polymerizing reaction.

Accordingly, the embodiment of the invention further provides a transparent conductive material, the transparent conductive material is an organic transparent conductive material formed upon polymerization of the conductive composition of the invention.

On the basis of the above, a transparent conductive solution may be formulated using the above described conductive composition. The transparent conductive solution may be directly coated onto a substrate surface, and form an organic transparent conductive layer after photo curing (for example, curing by ultraviolet light). Compared to the prior art using a transparent metal oxide such as ITO as the transparent conductive layer material, not only the production process of the transparent conductive layer may be efficiently simplified, but also the use of a sputtering device may avoided, thereby the production cost is lowered.

Without limiting to any theory, it is believed that the modified epoxy acrylic resin, the polyurethane acrylic resin and the polyaniline undergo a crosslinking polymerization reaction with the fluorine-containing acrylate monomer under the action of the photo initiator, and form the final conductive film layer, wherein the epoxy acrylic resin functions to improve the reaction speed of the crosslinking polymerization reaction, the polyurethane acrylic resin functions to improve the hardness of the film layer, and the polyaniline has a conductive function.

It should be explained that, the fluorine-containing acrylate monomer is chosen due to its excellent properties, for instance, the C-F chain has strong rigidity, high chemical stability, good whether resistance, good acid and base resistance and good oxidizing resistance, as well as high surface activity, strong hydrophobic and oleophobic property, good antistatic property and lubricity. The fluorine-containing acrylate monomer, when used as one raw material of the above described composition, may render the organic transparent conductive material good performance.

The filler means a particular solid filler for improving the performance of the composite, and it may comprise various types of fillers having different functions; for example, the filler may comprise a extender pigment for improving the wettability of the system (barium sulfate), a thickener for improving the stickiness of the system (an organic bentonite), a modifier for improving the material strength and uniform dispersibility of particles (talc powder), and the like. Of course, the filler may also comprise those having the other functions, which are not defined herein. The specific type and amount added may be determined according to practical requirements.

The photo initiator means a substance capable of producing a free radical or an anions/cation upon light irradiation, so as to initiate the polymerization reaction of monomers, to form a high molecular compound. Among them, there are lots of types of the photo initiators. In the embodiments of the invention, the photo initiator is not particularly limited as long as it is a photo initiator which can mix up with the materials in the above described composition, and exert the light initiating effect thereof.

The auxiliary agent means an auxiliary material added for improving the processing condition, improving the product quality, or rendering the product certain excellent characteristics; for example, a leveling agent for improving the film-forming property, an antifoaming agent for eliminating gas foam in a liquid system, a dispersant for reducing the particle aggregation in a dispersed system, and so on. Of course, the auxiliary agent may further comprise different auxiliary materials of other types, which are not specifically defined herein.

On the basis of the above, optionally, the leveling agent may facilitate the coating to form a flat, smooth, and even film layer during the film formation by drying. The leveling agent may be specifically selected from any one commercially available in the art, for example, BYK-300, BYK-306, BYK-307, BYK-310, BYK-315, BYK-320, BYK-323, BYK-325, and BYK-331, which are all manufactured and sold by BYK-Chemie, and the like.

The antifoaming agent is useful for eliminating gas foam present in the liquid. The antifoaming agent mainly includes a foam breaker, a foam inhibitor or a defoamer, all of which are capable of achieving the effect of eliminating gas foam, though the antifoaming principles are slightly different each other. The antifoaming agent may be specifically selected from any one commercially available in the art, for example BYK-141, BYK-A530, BYK-020, BYK-022, BYK-024, BYK-028, BYK-034, BYK-052, BYK-053, BYK-055, BYK-057, which are all manufactured and sold by BYK-Chemie, and the like.

The dispersant may reduce the aggregation degree of solid particles or liquid droplets in the dispersed system, so as to ensure the relative stability of the dispersed system. The dispersant is a surfactant having both oleophilicity and hydrophilicity as two opposite properties at a molecular level. The specific dispersant may be selected from any one commercially available in the art, for example, BYK-P104S, BYK-P104, BYK-101, BYK-103, BYK-107, BYK-108, BYK-110, BYK-111, BYK-161, which are all manufactured and sold by BYK-Chemie, and the like.

Furthermore, the modified epoxy acrylic resin has a functionality of from 2 to 5, and may specifically comprise one or more of a soybean oil modified epoxy acrylic resin, a modified bisphenol A epoxy acrylic resin, and an amino modified bisphenol A epoxy acrylic resin.

The polyurethane acrylic resin has a functionality of from 2 to 6, and may specifically comprise an aliphatic polyurethane acrylate and/or an aromatic polyurethane acrylate.

The photo initiator may comprise one or more of 2,4,6-trimethylbenzoyl-diphenylphosphine oxide, ethyl 2,4,6-trimethylbenzoylphenylphosphonate, 2-hydroxyl-2-methyl-1-phenyl-1-acetone, 1-hydroxyl-cyclohexyl-phenylmethanone, and benzoin bis-methyl ether.

The fluorine-containing acrylate monomer may comprise one or more of perfluoroethyl acrylate, 1,1,2,2-tetrahydroperfluorodecyl acrylate, hexafluorobutyl acrylate, hexafluorobutyl methacrylate, 2,2,2-trifluoroethyl methacrylate, dodecafluoroheptyl methacrylate, dodecafluoroheptyl acrylate, tridecafluorooctyl methacrylate, and tridecafluorooctyl acrylate.

The filler may comprise one or more of barium sulfate, talc powder, extinction powder, organic bentonite, fume silica, heavy calcium carbonate and light calcium carbonate.

Herein, the functionality means the number of functional groups involved in the reaction or the reaction ability of certain functional groups in a chemical reaction, that is, the number of the functional groups in a monomer which actually take part in the reaction in the reaction system.

Several specific Examples are provided below for illustrating the formulation of the organic transparent conductive material.

Example 1

20 parts of modified epoxy acrylic resin (EBECRYL 860, epoxidized soyabean oil acrylic resin, functionality of 2); 10 parts of polyurethane acrylic resin (CN9006NS from Sartomer Co., Ltd., aliphatic polyurethane acrylate, functionality of 6); 25 parts of polyaniline (XA-BA02, Hubei Yuancheng Chemicals Co., Ltd.); 2 parts of photo initiator (184, J&K Scientific Ltd.); 25 parts of tridecafluorooctyl methacrylate (Jintan Jinnuo Chemical Co., Ltd.); 10 parts of barium sulfate (20HB, Micropowder Industry Co., Ltd.); 5 parts of talc powder (TP-8533, Guangxi Hezhou Kelong Micro-powder Co., Ltd.); 1 part of leveling agent (BYK- 300); 1 part of antifoaming agent (BYK-141); and 1 part of dispersant (BYK-101) were weighted, in terms of weight ratio.

Example 2

15 parts of modified epoxy acrylic resin (EBECRYL 3420, modified bisphenol A acrylic resin, functionality of 3); 15 parts of polyurethane acrylic resin (EBECRYL 264, aliphatic polyurethane acrylate, functionality of 3); 15 parts of polyaniline (XA-BA02, Hubei Yuancheng Chemicals Co., Ltd.); 3 parts of photo initiator (184, J&K Scientific Ltd.); 22 parts of hexafluorobutyl methacrylate (Xeogia Fluorine-Silicon Material Co., Ltd.); 15 parts of barium sulfate (20HB, Micropowder Industry Co., Ltd.); 5 parts of talc powder (TP-8533, Guangxi Hezhou Kelong Micro-powder Co., Ltd.); 5 parts of fume silica (AEROSIL 200, EVONIK); 2 parts of leveling agent (BYK-306); 1 part of antifoaming agent (BYK-141); and 1 part of dispersant (BYK-103) were weighted, in terms of weight ratio.

Example 3

30 parts of modified epoxy acrylic resin (EBECRYL 860, epoxidized soyabean oil acrylic resin, functionality of 2); 10 parts of polyurethane acrylic resin (CN9006NS from Sartomer Co., Ltd., aliphatic polyurethane acrylate, functionality of 6); 15 parts of polyaniline (XA-BA02, Hubei Yuancheng Chemicals Co., Ltd.); 4 parts of photo initiator (TPO, SigmaAldrich); 15 parts of tridecafluorooctyl methacrylate (Jintan Jinnuo Chemical Co., Ltd.); 10 parts of barium sulfate (20HB, Micropowder Industry Co., Ltd.); 4 parts of talc powder (TP-8533, Guangxi Hezhou Kelong Micro-powder Co., Ltd.); 4 parts of fume silica (AEROSIL 200, EVONIK); 3 parts of leveling agent (BYK-300); 2 parts of antifoaming agent (BYK-141); and 3 parts of dispersant (BYK-101) were weighted, in terms of weight ratio.

Example 4

15 parts of modified epoxy acrylic resin (EBECRYL 3703, amino-modified bisphenol A acrylic resin, functionality of 5); 10 parts of polyurethane acrylic resin (CN9006NS from Sartomer Co., Ltd., aliphatic polyurethane acrylate, functionality of 6); 15 parts of polyaniline (XA-BA02, Hubei Yuancheng Chemicals Co., Ltd.); 3 parts of photo initiator (184, J&K Scientific Ltd.); 35 parts of tridecafluorooctyl methacrylate (Jintan Jinnuo Chemical Co., Ltd.); 12 parts of barium sulfate (20HB, Micropowder Industry Co., Ltd.); 5 parts of talc powder (TP-8533, Guangxi Hezhou Kelong Micro-powder Co., Ltd.); 2 parts of leveling agent (BYK-310); 1 part of antifoaming agent (BYK-141); and 2 parts of dispersant (BYK-107) were weighted, in terms of weight ratio.

Example 5

19 parts of modified epoxy acrylic resin (EBECRYL 3420, modified bisphenol A acrylic resin, functionality of 3); 15 parts of polyurethane acrylic resin (EBECRYL 264, aliphatic polyurethane acrylate, functionality of 3); 30 parts of polyaniline (XA-BA02, Hubei Yuancheng Chemicals Co., Ltd.); 3 parts of photo initiator (184, J&K Scientific Ltd.); 15 parts of tridecafluorooctyl methacrylate (Jintan Jinnuo Chemical Co., Ltd.); 8 parts of barium sulfate (20HB, Micropowder Industry Co., Ltd.); 5 parts of talc powder (TP-8533, Guangxi Hezhou Kelong Micro-powder Co., Ltd.); 2 parts of fume silica (AEROSIL 200, EVONIK); 1 part of leveling agent (BYK-300); 1 part of antifoaming agent (BYK-020); and 1 part of dispersant (BYK-101) were weighted, in terms of weight ratio.

Example 6

18 parts of modified epoxy acrylic resin (EBECRYL 3420, modified bisphenol A acrylic resin, functionality of 3); 18 parts of polyurethane acrylic resin (EBECRYL 264, aliphatic polyurethane acrylate, functionality of 3); 18 parts of polyaniline (XA-BA02, Hubei Yuancheng Chemicals Co., Ltd.); 3 parts of photo initiator (TPO, SigmaAldrich); 20 parts of tridecafluorooctyl methacrylate (Jintan Jinnuo Chemical Co., Ltd.); 12 parts of barium sulfate (20HB, Micropowder Industry Co., Ltd.); 5 parts of talc powder (TP-8533, Guangxi Hezhou Kelong Micro-powder Co., Ltd.); 3 parts of fume silica (AEROSIL 200, EVONIK); 1 part of leveling agent (BYK-300); 1 part of antifoaming agent (BYK-141); and 1 part of dispersant (BYK-101) were weighted, in terms of weight ratio.

Example 7

25 parts of modified epoxy acrylic resin (EBECRYL 860, epoxidized soyabean oil acrylic resin, functionality of 2); 10 parts of polyurethane acrylic resin (DOUBLEMER® 88A, aromatic polyurethane acrylate, functionality of 6); 25 parts of polyaniline (XA-BA02, Hubei Yuancheng Chemicals Co., Ltd.); 2 parts of photo initiator (184, J&K Scientific Ltd.); 35 parts of tridecafluorooctyl methacrylate (Jintan Jinnuo Chemical Co., Ltd.); 1 part of leveling agent (BYK-300); 1 part of antifoaming agent (BYK-141); and 1 part of dispersant (BYK-101) were weighted, in terms of weight ratio.

According to any formulation in the above described Examples and in combination with a suitable formulating method, the organic transparent conductive material may be obtained.

On the basis of the above, the embodiments of the invention further provide a method for formulating a transparent conductive solution. The method may comprise: mixing and dissolving a photo initiator with a fluorine-containing acrylate monomer; adding a modified epoxy acrylic resin, a polyurethane acrylic resin and a polyaniline, and uniformly dispersing them; adding a filler and uniformly dispersing it; grinding the uniformly mixed material, to obtain the organic transparent conductive solution, wherein, in terms of weight ratio, the modified epoxy acrylic resin comprises 15-30 parts; the polyurethane acrylic resin comprises 10-20 parts; the polyaniline comprises 15-30 parts; the photo initiator comprises 2-4 parts; the fluorine-containing acrylate monomer comprises 15-35 parts; and the filler comprises 15-25 parts.

It should be explained that, the organic transparent conductive solution obtained according to above described method is actually a (ultraviolet) photocurable oil, and an organic transparent conductive layer may be formed upon subjecting the organic transparent conductive solution to (ultraviolet) light curing.

Herein, when the photocurable oil is an ultraviolet light curable oil, it may be subjected to ultraviolet light curing in an irradiation device; wherein the irradiation device may comprise any of a low pressure mercury lamp, a middle pressure mercury lamp, a high pressure mercury lamp, and a Light-Emitting Diode (LED) light sources; of course, the irradiation device may also comprise any other device emitting ultraviolet light. In one embodiment of the invention, a high pressure mercury lamp is preferably used as the irradiation light source of ultraviolet light. In this regard, furthermore, the wavelength of the ultraviolet light is in the range of 200-400 nm, the irradiation energy of the ultraviolet light is in the range of 500-1200 mJ/cm$^2$, and preferably 600-800 mJ/cm$^2$.

On the basis of the above, at the same time of adding the modified epoxy acrylic resin, the polyurethane acrylic resin and the polyaniline, an auxiliary agent may be further added; in terms of weight ratio, the auxiliary agent comprises 3-8 parts; wherein the auxiliary agent may comprise one or more of a leveling agent, an antifoaming agent and a dispersant.

Furthermore, the modified epoxy acrylic resin has a functionality of from 2 to 5, and comprises one or more of a soybean oil modified epoxy acrylic resin, a modified bisphenol A epoxy acrylic resin, and an amino modified bisphenol A epoxy acrylic resin.

The polyurethane acrylic resin has a functionality of from 2 to 6, and comprises an aliphatic polyurethane acrylate and/or an aromatic polyurethane acrylate.

The photo initiator comprises one or more of 2,4,6-trimethylbenzoyl-diphenylphosphine oxide, ethyl 2,4,6-trimethylbenzoylphenylphosphonate, 2-hydroxyl-2-methyl-1-phenyl-1-acetone, 1-hydroxyl-cyclohexyl-phenylmethanone, and benzoin bis-methyl ether.

The fluorine-containing acrylate monomer comprises one or more of perfluoroethyl acrylate, 1,1,2,2-tetrahydroperfluorodecyl acrylate, hexafluorobutyl acrylate, hexafluorobutyl methacrylate, 2,2,2-trifluoroethyl methacrylate, dodecafluoroheptyl methacrylate, dodecafluoroheptyl acrylate, tridecafluorooctyl methacrylate, and tridecafluorooctyl acrylate.

The filler comprises one or more of barium sulfate, talc powder, extinction powder, organic bentonite, fume silica, heavy calcium carbonate and light calcium carbonate.

On the basis of the above description it can be seen that, the formulation of the organic transparent conductive solution requires subjecting various materials to mixing, dissolving, dispersing, and grinding. In this regard, preferably, the ground material has a fineness of less than 10 μm, which facilitate forming an uniformly dispersed organic transparent conductive solution, so as to improve the uniformity and smoothness of the organic transparent conductive layer.

It should be explained that, the embodiments of the invention do not specifically define the manner or device for implementing the above described process, provided that good effects can be achieved.

On the basis of the above, as shown by FIG. 1, the method for formulating the organic transparent conductive solution may specifically comprise:

S101, mixing and dissolving a photo initiator with a fluorine-containing acrylate monomer;

S102, adding a modified epoxy acrylic resin, a polyurethane acrylic resin, a polyaniline, and an auxiliary agent, and uniformly dispersing by a high speed dispersing machine;

S103, adding a filler, uniformly dispersing by a high speed dispersing machine, and then standing for 10 to 15 minutes, allowing the filler to be sufficiently wetted in the system; and S104, grinding by a three-roll grinding machine to a material fineness of less than 10 μm, so as to obtain an ultraviolet light curable oil, that is, the organic transparent conductive solution.

On the basis of the above described steps S101-S104, the organic transparent conductive solution may be obtained. Herein, the fluorine-containing acrylate monomer (the same as the monomer in step S101) may be further added again as required, and the coating should be initiated upon the viscosity of the mixed material is adjusted to a required degree; wherein the viscosity may be between 100 and 10000 cp. When an organic transparent conductive layer is required to be produced, the above described conductive solution may be simply coated on the surface of the substrate in a manner of blade coating or spin coating, and the organic transparent conductive layer is formed after ultraviolet light curing.

Figure 2:
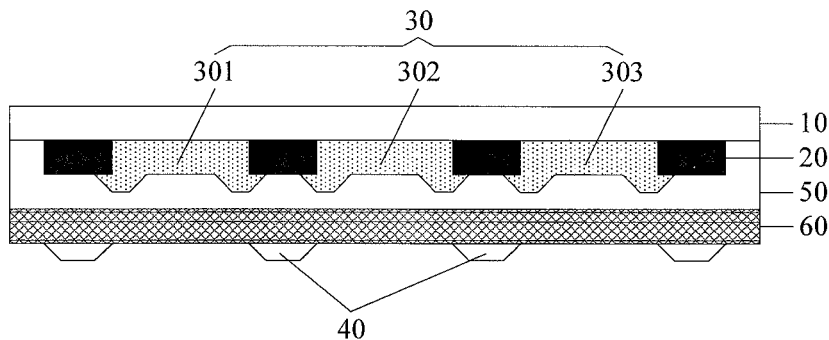
FIG. 2 is a structural schematic diagram of a color filter provided by the embodiment of the invention.
Figure 3:
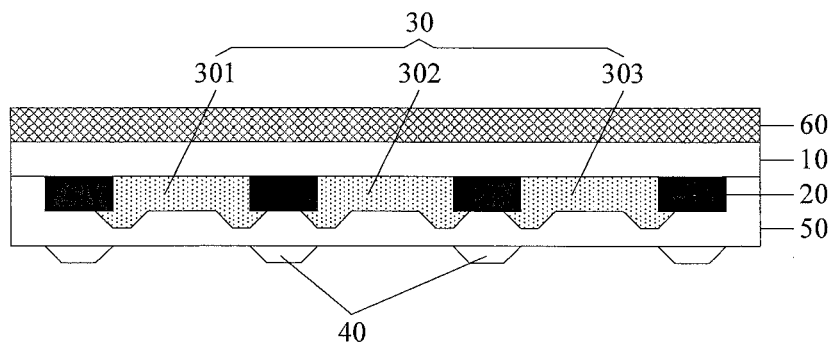
FIG. 3 is another structural schematic diagram of a color filter provided by the embodiment of the invention.

One embodiment of the invention provides a color filter, as shown in FIG. 2 and FIG. 3, the color filter may comprise a black matrix 20, a color filter layer 30, a post spacer 40, and an organic transparent conductive layer 60 provided on a substrate 10, wherein the organic transparent conductive layer 60 is provided on the first side or the second side of the substrate 10; and the material of the organic transparent conductive layer 60 is the above described organic transparent conductive material.

Herein, the post spacer 40 may be disposed at the positions corresponding to the black matrix 20. The substrate 10 may be a glass substrate or a flexible substrate, and it is not specifically limited herein. The flexible substrate may comprise any of Polyethylene Naphthalate (PEN), Polyethylene Terephthalate (PET), Polyether Sulfones (PES) or Polyimide (PI).

When the color filter is applied to a liquid crystal display panel, the liquid crystal display panel may comprise an array substrate and a color film substrate, and a liquid crystal layer between them; wherein before alignment, the color filter should be coated with a PI liquid and an orientated layer is formed by rubbing. Thus, in the case that the liquid crystal display panel is one of TN mode, the color filter may comprise an organic transparent conductive layer 60 as the common electrode; at this time, the organic transparent conductive layer 60 may be produced on the side of the substrate 10 closer to the liquid crystal layer, that is, the first side of the substrate 10, as shown in FIG. 2. In the case that the liquid crystal display panel is one of FFS mode or ADS mode, the color filter may comprise the organic transparent conductive layer 60 as the antistatic layer; at this time, the organic transparent conductive layer 60 may be produced on the side of the substrate 10 away from the liquid crystal layer, that is, the second side of the substrate 10, as shown in FIG. 3.

The embodiment of the invention choose the organic transparent conductive material for producing the organic transparent conductive layer 60 which may replace the transparent metal oxide such as ITO conductive layer in the prior art; in this way, not only the complexity of the process may be reduced, but also the use of sputtering device may be avoided, so as to reduce the production cost.

In order to satisfy the requirements of a display device for the performance of the transparent conductive layer, the organic transparent conductive layer 60 should have certain hardness. Specifically, the hardness of the organic transparent conductive layer 60 may be measured by the following method: the cores of MITSUBISHI pencils with hardness of 6B to 9H are cut into column shape, respectively, and rubbed down on a 400-mesh sand paper; the pencils with different hardness are sequentially pushed forward 5 mm on the organic transparent conductive layer 60, to draw 5 lines in total; wherein the load applied on the tip of the pencil is 1 Kg, and the angle between the pencil and the surface of the organic transparent conductive layer 60 is 45°; the marks of the pencil are rubbed out using a eraser, and the presence or absence of scratch on the surface of the organic transparent conductive layer 60 is checked; wherein the scratch produced by a part of pencils is 1 line or less, then the maximum hardness of such pencils is the hardness of the organic transparent conductive layer 60.

Figures 4, 5:
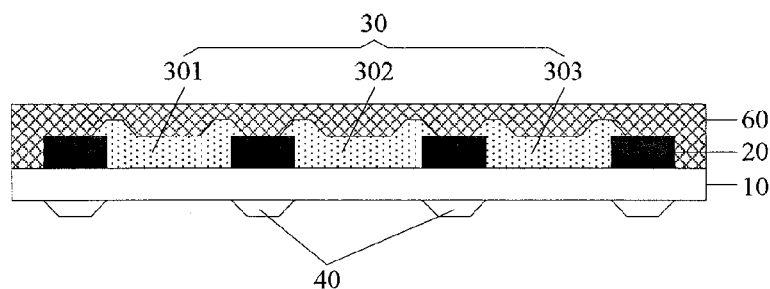
FIG. 4 shows the hardness values measured for the organic transparent conductive layers provided by the embodiments of the invention.
FIG. 5 is a structural schematic diagram of a color filter provided by the embodiment of the invention.

For the organic transparent conductive layers 60 produced using the formulations of the organic transparent conductive materials provided in the above described specific Examples, the hardness thereof were tested by the above method, and the testing results were shown in FIG. 4. It can be seen that, the organic transparent conductive layers 60 provided by the Examples of the invention have hardness basically between 5H and 7H, having good mechanical performance.

On the basis of the above, when the organic transparent conductive layer 60 is provided as the antistatic layer on the outermost side of the color filter, it also functions as a protective layer.

In addition, in order to prevent light leaking, the black matrix 20 and the color filter layer 30 are disposed overlapping each other, but such arrangement may result in the overlap produced inside the color filter; in this case, as shown by FIG. 2 and FIG. 3, the overlap between the black matrix 20 and the color filter layer 30 may be filled by providing an Over Coating (OC) 50, to eliminate such overlap.

Even in the case of eliminating the above described overlap by the OC layer 50, the color filter may further comprise overlaps formed by the presence of post spacer (PS) 40. Specifically, the orientated layer is provided on the side of the post spacer 40 away from the substrate 10, and directly contacts with the post spacer 40; because the post spacer 40 has a function of supporting, it may be used for controlling the box thickness of the liquid crystal display device, therefore such overlap could not be eliminated by producing the OC layer 50. In such way, the film-forming and rubbing process of the orientated layer will be directly effected on the post spacer 40, and consequently, the presence of such overlap may cause disadvantage influence to the production of the orientated layer, for example, it may cause the display defects of the liquid crystal display panel.

Furthermore, because the blocking ability of the material of the OC layer 50 is insufficient, it may lead to the entrance of ions in the color filter layer 30 into the liquid crystal layer, resulting in contamination in the box, and thereby forming residual voltage, which may cause defects such as afterimage, streaking, and the like.

In this regard, preferably, the post spacer 40 may be provided on the first side of the substrate 10; the black matrix 20 and the color filter layer 30 may be provided on the second side of the substrate 10, and the black matrix 20 has openings for providing the color filter layer 30, as shown in FIG. 5.

Wherein, the first side is close to the liquid crystal layer, and the second side is away from the liquid crystal layer.

In this way, by providing the black matrix 20 and the color filter layer 30 on the side of the substrate 10 away from the liquid crystal layer, the production of the OC layer 50 may be omitted, which may not only simplify the process, but also avoid the display defects which may be caused by the insufficient blocking ability of the OC layer material.

On the basis of the above, more preferably, the organic transparent conductive layer 60 may be provided on the second side of the substrate 10; wherein the black matrix 20 and the color filter layer 30 are provided between the organic transparent conductive layer 60 and the substrate 10.

Specifically, the black matrix 20 may be provided close to the substrate 10, and the color filter layer 30 may be provided close to the organic transparent conductive layer 60; or alternatively, the black matrix 20 may be provided close to the organic transparent conductive layer 60, and the color filter layer 30 may be provided close to the substrate 10. The embodiment of the invention does not specifically define the relative position of the black matrix 20 and the color filter layer 30, provided that the color filter layer 30 is located in the open area of the black matrix 20, to achieve the prevention of light mixing.

The color filter based on the above described structure may be applied to a liquid crystal display panel in FFS mode or in ADS mode; wherein the organic transparent conductive layer 60 is the antistatic layer of the color filter surface.

When the color filter is applied to a liquid crystal display panel in TN mode, the organic transparent conductive layer 60 may be provided on the first side of the substrate 10; wherein the post spacer 40 is provided on the side of the organic transparent conductive layer 60 away from the substrate 10. At this time, the organic transparent conductive layer 60 may be used as the common electrode of the color filter.

Under such conditions, the color filter should further comprise a protective layer provided on the second side of the substrate 10; the black matrix 20 and the color filter layer 30 are between the protective layer and the substrate 10.

One embodiment of the invention further provides a method for producing a color filter, comprising: forming a black matrix 20, a color filter layer 30, a post spacer 40, and an organic transparent conductive layer 60 on a substrate 10; wherein the process for forming the organic transparent conductive layer 60 specifically comprises: coating a transparent conductive solution on the first side or the second side of the substrate 10, and forming the organic transparent conductive layer 60 by ultraviolet light curing; the transparent conductive solution is formulated by the above described method for formulating a conductive solution.

On the basis of the above, preferably, forming a black matrix 20, a color filter layer 30, and a post spacer 40 on the substrate 10 may specifically comprise: forming the post spacer 40 on the first side of the substrate 10; forming the black matrix 20 and the color filter layer 30 on the second side of the substrate 10; wherein the color filter layer 30 may be formed on the open area of the black matrix 20.

More preferably, the process for forming the organic transparent conductive layer 60; the black matrix 20, the color filter layer 30, and the organic transparent conductive layer 60 on the second side of the substrate 10 specifically comprises: forming the black matrix 20 having openings and the color filter layer 30 on the surface at the second side of the substrate 10; wherein the color filter layer 30 may be formed on the open area of the black matrix 20; the color filter layer 30 comprises at least a red light resistance 301, a green light resistance 302 and a blue light resistance 303; and forming the organic transparent conductive layer 60 on the substrate surface with the black matrix 20 and the color filter layer 30 formed thereon.

It should be explained that, when the black matrix 20 and the color filter layer 30 are formed on the surface at the second side of the substrate 10, the black matrix 20 having openings may be firstly formed, and the color filter layer 30 is then formed over the black matrix 20 at the position corresponding to the open area; alternatively, the color filter layer 30 may be firstly formed, and the black matrix 20 is then formed over the color filter layer 30, and the color filter layer 30 corresponds to the open area of the black matrix 20.

A specific embodiment is provided below for illustrating the process for producing a color filter; wherein the color filter has an antistatic layer, and may be applied to a liquid crystal display panel in FFS mode or ADS mode.

On the basis of the above, the producing process of the color filter may specifically comprise the following steps:

S201, providing substrate 10; wherein, the substrate 10 is a glass substrate;

S202, forming a black light blocking layer on the surface at the second side of the substrate 10 in the manner of spin coating or blade coating, and forming a black matrix 20 having openings by exposing, developing, and baking;

S203, forming a layer of red filter layer material on the substrate surface with the black matrix 20 formed thereon in the manner of spin coating or blade coating, and forming a red light resistance 301 by exposing, developing, and baking; forming a layer of green filter layer material on the substrate surface with the red light resistance 301 formed thereon in the manner of spin coating or blade coating, and forming a green light resistance 302 by exposing, developing, and baking; and forming a layer of blue filter layer material on the substrate surface with the green light resistance 302 formed thereon in the manner of spin coating or blade coating, and forming a blue light resistance 303 by exposing, developing, and baking;

wherein, the red light resistance 301, the green light resistance 302, and the blue light resistance 303 are alternatively arranged, composing the color filter layer 30 together; and the red light resistance 301, the green light resistance 302, and the blue light resistance 303 all correspond to the open area of the black matrix 20;

S204, forming a layer of organic transparent conductive solution on substrate surface with the color filter layer 30 formed thereon in the manner of spin coating or blade coating, and forming the organic transparent conductive layer 60 by ultraviolet light curing;

Herein, the organic transparent conductive layer 60 is the antistatic layer of the color filter;

S205, coating a layer of post spacer material on the surface at the first side of the substrate 10, forming the post spacer 40 by a photolithography process.

A color filter may be produced through the above described steps S201-S205. By providing the post spacer 40 on one side of the substrate 10, while providing the black matrix 20, the color filter layer 30, and the organic transparent insulation layer 60 on the other side of the substrate 10, not only the overlap produced by alternatively arrangement of the black matrix 20 and the color filter layer 30 may be eliminated, but also the production process of the transparent conductive layer may be simplified, and the use of a sputtering device is avoided, so as to reduce the cost.

Alternatively, the organic transparent conductive layer 60 may also be formed on the first side of the substrate 10; in such case, the process for forming the post spacer 40 and the organic transparent conductive layer 60 may specifically comprise: forming an organic transparent conductive layer 60 on the surface at the first side of the substrate 10; forming a post spacer 40 on the surface with the organic transparent conductive layer 60 formed thereon; wherein the position of the post spacer 40 corresponds to the position of the black matrix 30.

Herein, the organic transparent conductive layer 60 may be used as the common electrode on the color filter, and the color filter may be applied to the liquid crystal display panel in TN mode.

One embodiment of the invention further provides a display device comprising the above described color filter. The display device may be a liquid crystal panel, an electronic paper, an OLED (Organic Light Emitting Diode) panel, a mobile phone, a tablet computer, a television, a displayer, a notebook computer, a digital frame, a navigator, and any other product or component having display function.

The above described embodiments are only the specific embodiments of the invention, but protection scope of the invention is not limited thereto. Any replacement or alternation, which may be easily recognized by a person skilled in the art within technical scope disclosed by the invention, should be included in the protection scope of the invention. Therefore, the protection scope of the invention should be determined by the protection scope of the claims.

What is claimed is:

1. A conductive composition consisting of modified epoxy acrylic resin, a polyurethane acrylic resin, a polyaniline, a photo initiator, a fluorine-containing acrylate monomer, and optionally a filler and an auxiliary agent;
    wherein, in terms of weight ratio, the modified epoxy acrylic resin is 15-30 parts; the polyurethane acrylic resin is 10-20 parts; the polyaniline is 15-30 parts; the photo initiator is 2-4 parts; the fluorine-containing acrylate monomer is 15-35 parts; the filler is 0-25 parts; and the auxiliary agent is 0-8 parts;
    wherein, the auxiliary agent comprises one or more of a leveling agent, an antifoaming agent, and a dispersant.

2. The conductive composition according to claim 1, wherein the modified epoxy acrylic resin has a functionality of from 2 to 5, and comprises one or more of a soybean oil modified epoxy acrylic resin, a modified bisphenol A epoxy acrylic resin, and an amino modified bisphenol A epoxy acrylic resin.

3. The conductive composition according to claim 1, wherein the polyurethane acrylic resin has a functionality of 2 to 6, and comprises an aliphatic polyurethane acrylate and/or an aromatic polyurethane acrylate.

4. The conductive composition according to claim 1, wherein the photo initiator comprises one or more of 2,4,6-trimethylbenzoyl-diphenylphosphine oxide, ethyl 2,4,6-trimethylbenzoylphenylphosphonate, 2-hydroxyl-2-methyl-1-phenyl-1-acetone, 1-hydroxyl-cyclohexyl-phenylmethanone, and benzoin bis-methyl ether.

5. The conductive composition according to claim 1, wherein the fluorine-containing acrylate monomer comprises one or more of perfluoroethyl acrylate, 1,1,2,2-tetrahydroperfluorodecyl acrylate, hexafluorobutyl acrylate, hexafluorobutyl methacrylate, 2,2,2-trifluoroethyl methacrylate, dodecafluoroheptyl methacrylate, dodecafluoroheptyl acrylate, tridecafluorooctyl methacrylate, and tridecafluorooctyl acrylate.

6. The conductive composition according to claim 1, wherein the filler comprises one or more of barium sulfate, talc powder, extinction powder, organic bentonite, fume silica, heavy calcium carbonate and light calcium carbonate.

* * * * *